(12) United States Patent
Huang

(10) Patent No.: US 7,290,670 B2
(45) Date of Patent: Nov. 6, 2007

(54) BIKE RACK HAVING QUICK FOLDING/UNFOLDING FUNCTION

(76) Inventor: Chin-Sung Huang, 152, Cai Liao Rd., Pi Jiao Village, Pu Xin Shiang, Changhua Hsien (TW)

( * ) Notice: Subject to any disclaimer, the term of this patent is extended or adjusted under 35 U.S.C. 154(b) by 240 days.

(21) Appl. No.: 11/179,948

(22) Filed: Jul. 12, 2005

(65) Prior Publication Data

US 2007/0012634 A1   Jan. 18, 2007

(51) Int. Cl.
*A47F 7/00* (2006.01)

(52) U.S. Cl. ...................................... 211/17

(58) Field of Classification Search ............... 211/4, 211/17, 22; 224/520, 503, 504, 532, 924
See application file for complete search history.

(56) References Cited

U.S. PATENT DOCUMENTS

| | | | | |
|---|---|---|---|---|
| 3,858,775 A | * | 1/1975 | Haas | 224/520 |
| 5,121,862 A | * | 6/1992 | Schmidt | 224/520 |
| 5,228,607 A | * | 7/1993 | Tolsdorf | 224/520 |
| 5,232,133 A | * | 8/1993 | Speer | 224/485 |
| 5,285,937 A | * | 2/1994 | Schmidt | 224/520 |
| 5,388,736 A | * | 2/1995 | Schmidt | 224/520 |
| 5,579,974 A | * | 12/1996 | Schmidt | 224/520 |
| 5,588,574 A | * | 12/1996 | Schmidt | 224/520 |
| 5,871,131 A | * | 2/1999 | Low et al. | 224/537 |
| 5,950,892 A | * | 9/1999 | Tsai | 224/520 |
| 6,164,683 A | * | 12/2000 | Kalman | 280/656 |
| 6,971,565 B2 | * | 12/2005 | Wang | 224/497 |
| 2007/0057001 A1 | * | 3/2007 | Wang | 224/536 |

* cited by examiner

*Primary Examiner*—Jennifer E. Novosad
(74) *Attorney, Agent, or Firm*—Alan Kamrath; Kamrath & Associates PA

(57) ABSTRACT

A bike rack includes two main arms, two links, and a locking mechanism. The locking mechanism includes a first pivot member pivotally mounted on a first main arm, a second pivot member pivotally mounted on a second main arm and pivotally connected with the first pivot member, and a control handle secured to the second pivot member to drive the locking mechanism to expand and fold the two main arms. Thus, the control handle is held by a user' one hand to operate the locking mechanism so as to lock and unlock the bike rack, thereby facilitating the user mounting and detaching the bike rack.

13 Claims, 4 Drawing Sheets

BIKE RACK HAVING QUICK FOLDING/UNFOLDING FUNCTION

BACKGROUND OF THE INVENTION

1. Field of the Invention

The present invention relates to a bike rack, and more particularly to a bike rack having a quick folding/unfolding function.

2. Description of the Related Art

A conventional bike rack in accordance with the prior art shown in FIGS. 5 and 6 comprises two main arms 1 each having a lower end provided with a mounting member 2 and an upper end provided with a support rod 4, two opposite links 3 pivotally mounted on the lower ends of the two main arms 1 and located above the mounting members 2 of the two main arms 1, and a locking mechanism 5 pivotally mounted between the two main arms 1 to limit movement of the two main arms 1. The locking mechanism 5 includes a first pivot member 54 pivotally mounted on a first one of the two main arms 1, and a second pivot member 55 pivotally mounted on a second one of the two main arms 1 and pivotally connected with the first pivot member 54.

In operation, the mounting members 2 of the two main arms 1 face a ball 7 of a support seat 6 which is mounted on a car. Then, the first pivot member 54 and the second pivot member 55 are pushed by a user to pivot downward until the first pivot member 54 and the second pivot member 55 are in line with each other to form a horizontal state, so that the upper ends of the two main arms 1 are moved outward relative to each other and the lower ends of the two main arms 1 are moved toward each other to move and close the mounting members 2 of the two main arms 1 so as to clamp the ball 7 of the support seat 6 of the car. Thus, the bike rack is mounted on the support seat 6 of the car for supporting a bicycle which is hung on the support rods 4 of the two main arms 1.

Alternatively, the first pivot member 54 and the second pivot member 55 are pulled upward by the user to drive the first pivot member 54 and the second pivot member 55 to pivot upward, so that the upper ends of the two main arms 1 are moved toward each other and the lower ends of the two main arms 1 are moved outward relative to each other to move and open the mounting members 2 of the two main arms 1 so as to release the ball 7 of the support seat 6 of the car, thereby detaching the bike rack from the support seat 6 of the car.

However, the user has to push and pull the first pivot member 54 and the second pivot member 55 to expand and fold the bike rack, thereby wasting the manual work. In addition, the user' one hand directly touches the first pivot member 54 and the second pivot member 55, so that the user' one hand is easily clamped by the first pivot member 54 and the second pivot member 55 during upward and downward operation of the locking mechanism 5, thereby causing danger to the user.

SUMMARY OF THE INVENTION

The primary objective of the present invention is to provide a bike rack having a quick folding/unfolding function.

Another objective of the present invention is to provide a bike rack, wherein the control handle is held by a user' one hand to operate the locking mechanism so that the user only needs to hold the control handle so as to lock the bike rack on the support seat of the car and unlock the bike rack from the support seat of the car, thereby facilitating the user mounting and detaching the bike rack.

A further objective of the present invention is to provide a bike rack, wherein the bike rack is mounted and detached easily and rapidly by operation of the control handle, thereby saving the manual work and the time of assembly.

A further objective of the present invention is to provide a bike rack, wherein the user' one hand holds the control handle without directly touching the first pivot member and the second pivot member, thereby preventing the user' one hand from being clamped by the first pivot member and the second pivot member during upward and downward operation of the locking mechanism so as to protect the user's safety.

Further benefits and advantages of the present invention will become apparent after a careful reading of the detailed description with appropriate reference to the accompanying drawings.

DETAILED DESCRIPTION OF THE INVENTION

Figure 1:
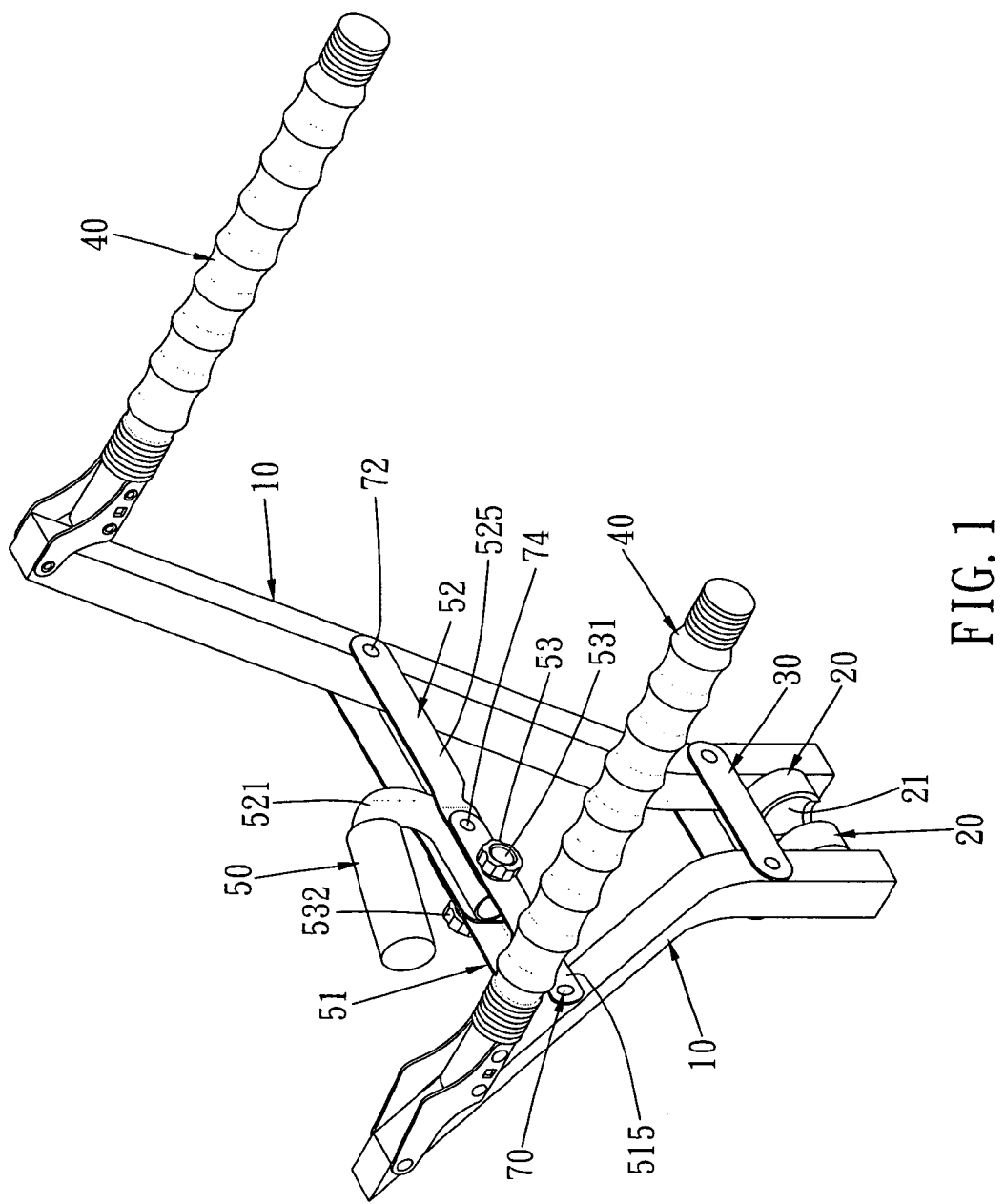
FIG. 1 is a perspective view of a bike rack in accordance with the preferred embodiment of the present invention.
Figure 2:
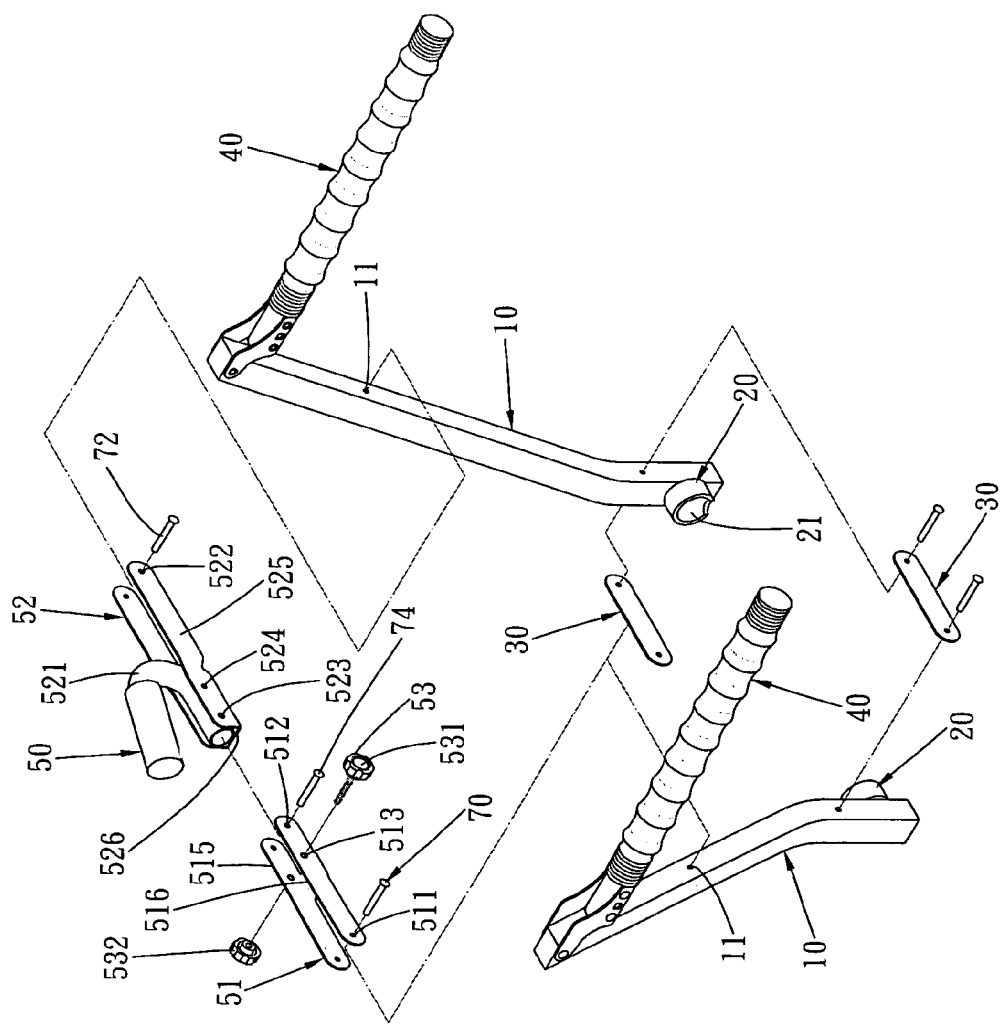
FIG. 2 is an exploded perspective view of the bike rack as shown in FIG. 1.

Referring to the drawings and initially to FIGS. 1 and 2, a bike rack in accordance with the preferred embodiment of the present invention comprises two main arms 10 each having a lower end provided with a mounting member 20 and an upper end provided with a support rod 40, two opposite links 30 pivotally mounted on the lower ends of the two main arms 10 and located above the mounting members 20 of the two main arms 10, and a locking mechanism 50 pivotally mounted between the two main arms 10 to limit movement of the two main arms 10.

Each of the two main arms 10 has a mediate portion formed with a through hole 11. The mounting member 20 is mounted on an inner side of each of the two main arms 10 and has a semi-spherical concave portion 21. The concave portions 21 of the mounting members 20 of the two main arms 10 face each other. The support rod 40 is pivotally and foldably mounted on each of the two main arms 10.

The locking mechanism 50 includes a first pivot member 51 pivotally mounted on a first one of the two main arms 10, a second pivot member 52 pivotally mounted on a second one of the two main arms 10 and pivotally connected with the first pivot member 51, and a control handle 521 secured to the second pivot member 52 to drive the locking mechanism 50 between a first position where the locking mechanism 50 is pressed downward so as to expand the two main arms 10 and a second position where the locking mechanism 50 is pivoted upward so as to fold the two main arms 10.

The first pivot member 51 of the locking mechanism 50 has a substantially U-shaped cross-sectional profile and includes two elongated upright pieces 515 and a catch piece 516 connected between the two upright pieces 515. The first pivot member 51 of the locking mechanism 50 has a first end formed with a pivot hole 511 pivotally mounted on the through hole 11 of the first main arm 10 by a pivot shaft 70. The first pivot member 51 of the locking mechanism 50 has a second end formed with a pivot bore 512. The first pivot member 51 of the locking mechanism 50 has a mediate portion formed with a positioning hole 513 located adjacent to the pivot bore 512.

The second pivot member 52 of the locking mechanism 50 has a substantially U-shaped cross-sectional profile and includes two elongated upright plate 525 and a catch plate 526 connected between the two upright plate 525. The second pivot member 52 of the locking mechanism 50 has a first end formed with a pivot hole 522 pivotally mounted on the through hole 11 of the second main arm 10 by a pivot shaft 72. The second pivot member 52 of the locking mechanism 50 has a mediate portion pivotally mounted on the second end of the first pivot member 51. The mediate portion of the second pivot member 52 of the locking mechanism 50 has a pivot bore 524 pivotally mounted on the pivot bore 512 of the first pivot member 51 by a pivot shaft 74. The second pivot member 52 of the locking mechanism 50 has a second end releasably locked on the mediate portion of the first pivot member 51 by a screw member 53.

The second end of the second pivot member 52 of the locking mechanism 50 has a positioning hole 523 located adjacent to the pivot bore 524. The screw member 53 includes a locking screw 531 extended through the positioning hole 513 of the first pivot member 51 and the positioning hole 523 of the second pivot member 52, and a locking nut 532 screwed onto the locking screw 531 to fix the second pivot member 52 on the first pivot member 51.

The control handle 521 of the locking mechanism 50 is substantially U-shaped and has a first section secured to the second pivot member 52 to drive the second pivot member 52 and a second section protruded and spaced from the second pivot member 52 to facilitate grip of a user.

Figure 3:
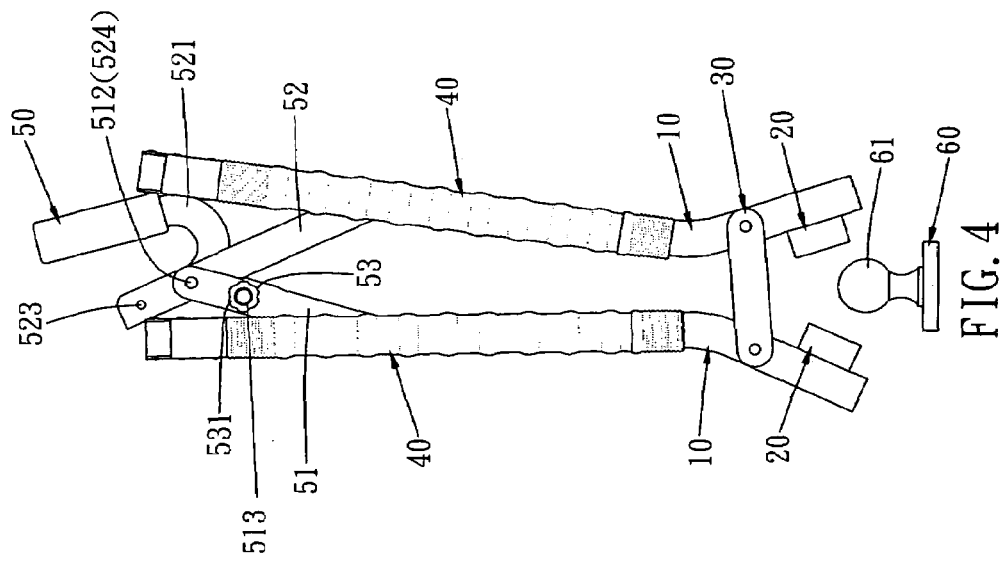
FIG. 3 is a plan view of the bike rack as shown in FIG. 1.

Referring to FIG. 3 with reference to FIGS. 1 and 2, the concave portions 21 of the mounting members 20 of the two main arms 10 face a ball 61 of a support seat 60 which is mounted on a car. Then, the control handle 521 is pushed downward to drive the second pivot member 52 and the first pivot member 51 to pivot downward until the second pivot member 52 and the first pivot member 51 are in line with each other to form a horizontal state, so that the upper ends of the two main arms 10 are moved outward relative to each other and the lower ends of the two main arms 10 are moved toward each other to move and close the mounting members 20 of the two main arms 10 so as to clamp the ball 61 of the support seat 60 of the car. At this time, the positioning hole 513 of the first pivot member 51 is in alignment with the positioning hole 523 of the second pivot member 52. Then, the locking screw 531 is extended through the positioning hole 513 of the first pivot member 51 and the positioning hole 523 of the second pivot member 52, and the locking nut 532 is screwed onto the locking screw 531 to fix the second pivot member 52 on the first pivot member 51. Thus, the bike rack is mounted on the support seat 60 of the car for supporting a bicycle which is hung on the support rods 40 of the two main arms 10.

Figure 4:
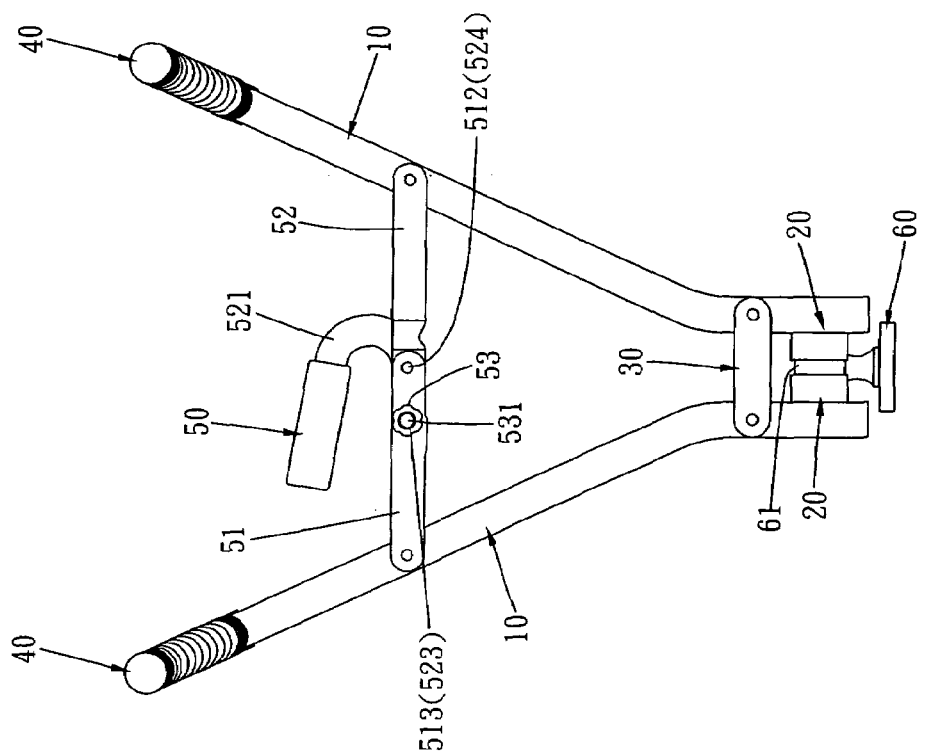
FIG. 4 is a schematic operational view of the bike rack as shown in FIG. 3.
Figure 6:
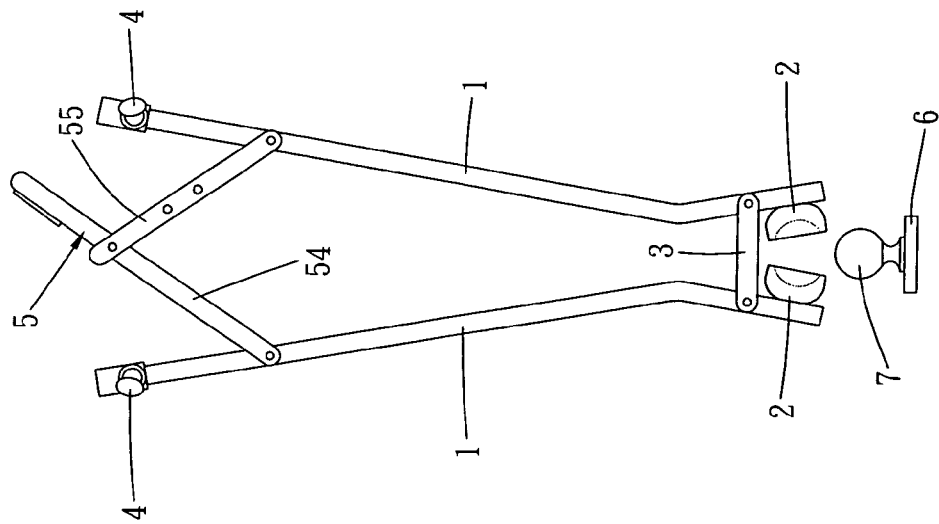
FIG. 6 is a schematic operational view of the conventional bike rack as shown in FIG. 5.
Figure 5:
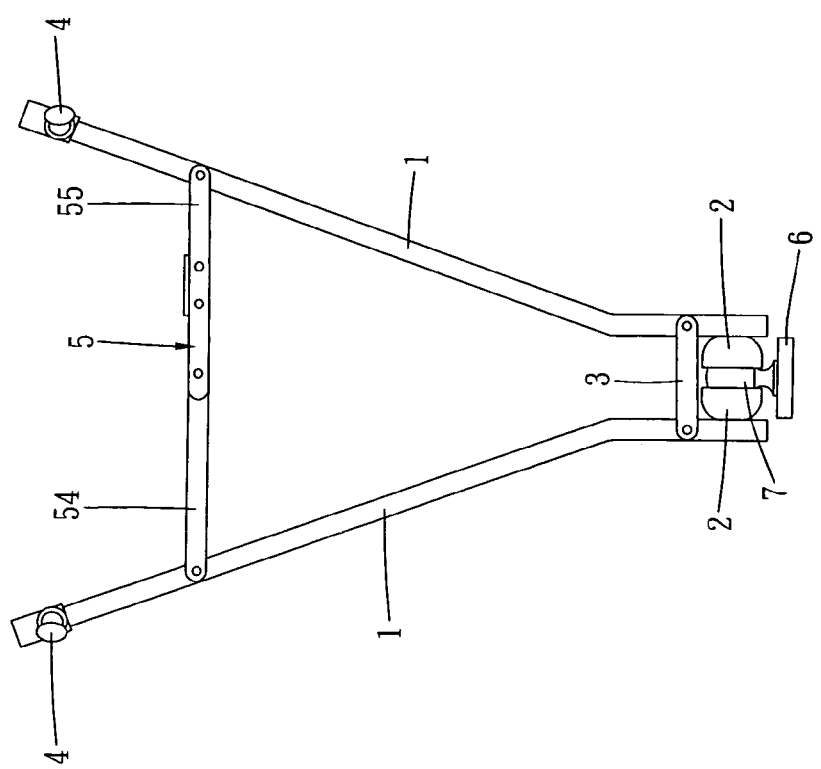
FIG. 5 is a plan view of a conventional bike rack in accordance with the prior art.

Referring to FIG. 4 with reference to FIGS. 1 and 2, the locking nut 532 is unscrewed from the locking screw 531, and the locking screw 531 is detached from the positioning hole 513 of the first pivot member 51 and the positioning hole 523 of the second pivot member 52 to release the second pivot member 52 from the first pivot member 51.

Then, the control handle 521 is pulled upward to drive the second pivot member 52 and the first pivot member 51 to pivot upward, so that the upper ends of the two main arms 10 are moved toward each other and the lower ends of the two main arms 10 are moved outward relative to each other to move and open the mounting members 20 of the two main arms 10 so as to release the ball 61 of the support seat 60 of the car, thereby detaching the bike rack from the support seat 60 of the car.

Accordingly, the control handle 521 is held by a user' one hand to operate the locking mechanism 50 so that the user only needs to hold the control handle 521 so as to lock the bike rack on the support seat 60 of the car and unlock the bike rack from the support seat 60 of the car, thereby facilitating the user mounting and detaching the bike rack. In addition, the bike rack is mounted and detached easily and rapidly by operation of the control handle 521, thereby saving the manual work and the time of assembly. Further, the user' one hand holds the control handle 521 without directly touching the first pivot member 51 and the second pivot member 52, thereby preventing the user' one hand from being clamped by the first pivot member 51 and the second pivot member 52 during upward and downward operation of the locking mechanism 50 so as to protect the user's safety.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A bike rack, comprising:
   two main arms each having a lower end provided with a mounting member and an upper end provided with a support rod;
   two opposite links pivotally mounted on the lower ends of the two main arms and located above the mounting members of the two main arms;
   a locking mechanism pivotally mounted between the two main arms to limit movement of the two main arms; wherein:
   the locking mechanism includes a first pivot member pivotally mounted on a first one of the two main arms, a second pivot member pivotally mounted on a second one of the two main arms and pivotally connected with the first pivot member, and a control handle secured to the second pivot member to drive the locking mechanism between a first position where the locking mechanism is pressed downward so as to expand the two main arms and a second position where the locking mechanism is pivoted upward so as to fold the two main arms;
   when the locking mechanism is disposed at the first position, the first pivot member and the second pivot member are in line with each other, and the control handle of the locking mechanism protrudes outwardly from the first pivot member and the second pivot member;
   the control handle of the locking mechanism is substantially U-shaped;
   the control handle of the locking mechanism has a first section secured to the second pivot member to drive the second pivot member and a second section protruded and spaced from the first section of the control handle and the second pivot member to facilitate a user gripping the control handle.

2. The bike rack in accordance with claim 1, wherein the first pivot member of the locking mechanism has a substantially U-shaped cross-sectional profile.

3. The bike rack in accordance with claim 1, wherein the first pivot member of the locking mechanism includes two elongated upright pieces and a catch piece connected between the two upright pieces.

4. The bike rack in accordance with claim 1, wherein the second pivot member of the locking mechanism has a substantially U-shaped cross-sectional profile.

5. The bike rack in accordance with claim 1, wherein the second pivot member of the locking mechanism includes two elongated upright plate and a catch plate connected between the two upright plates.

6. The bike rack in accordance with claim 1, wherein each of the two main arms has a mediate portion formed with a through hole, the first pivot member of the locking mechanism has a first end formed with a pivot hole pivotally mounted on the through hole of the first main arm, and the second pivot member of the locking mechanism has a first end formed with a pivot hole pivotally mounted on the through hole of the second main arm.

7. The bike rack in accordance with claim 6, wherein the second pivot member of the locking mechanism has a mediate portion pivotally mounted on a second end of the first pivot member.

8. The bike rack in accordance with claim 7, wherein the second end of the first pivot member of the locking mechanism has a pivot bore, and the mediate portion of the second pivot member of the locking mechanism has a pivot bore pivotally mounted on the pivot bore of the first pivot member.

9. The bike rack in accordance with claim 8, wherein the second pivot member of the locking mechanism has a second end releasably locked on a mediate portion of the first pivot member by a screw member.

10. The bike rack in accordance with claim 9, wherein the mediate portion of the first pivot member of the locking mechanism has a positioning hole, the second end of the second pivot member of the locking mechanism has a positioning hole, and the screw member includes a locking screw extended through the positioning hole of the first pivot member, the positioning hole of the second pivot member and the first section of the control handle, and a locking nut screwed onto the locking screw to fix the second pivot member on the first pivot member.

11. The bike rack in accordance with claim 10, wherein the control handle is pushed downward to drive the second pivot member and the first pivot member to pivot downward until the second pivot member and the first pivot member are in line with each other, so that the positioning hole of the first pivot member is in alignment with the positioning hole of the second pivot member.

12. The bike rack in accordance with claim 10, wherein the control handle of the locking mechanism has an opening defined between the first section and the second section.

13. The bike rack in accordance with claim 10, wherein the positioning hole of the first pivot member is located between the pivot hole and the pivot bore of the first pivot member, and the pivot bore of the second pivot member is located between the positioning hole and the pivot hole and of the second pivot member.

* * * * *